Patented May 27, 1952

2,598,645

UNITED STATES PATENT OFFICE 2,598,645

STYRENATED-UNSATURATED OIL MODIFIED ALKYD, DRYING OIL, AND A PHENOL-STYRENE OXIDE RESIN COATING COMPOSITION

Paul E. Marling, Dayton, Ohio, assignor to Monsanto Chemical Company, St. Louis, Mo., a corporation of Delaware No Drawing. Application September 29, 1948, Serial No. 51,860

3 Claims. (Cl. 260—22)

This invention relates to improved coating compositions readily prepared from inexpensive and abundantly available raw materials. More particularly the invention relates to self drying film forming compositions involving styrenated alkyd resins and styrene oxide phenolic condensation products.

The paint and varnish industry has been seeking to adapt styrene to coating composition uses because of its low cost and general availability. Many useful coating compositions have been prepared but are not of general utility because of their brittleness and because of the difficulty of avoiding incompatibility with more conventional varnish ingredients. This incompatibility tends to reduce the strength of the film, increase its susceptibility to water and alkali, as well as to produce opaque coatings. It is also known that transparent drying oil substitutes can be prepared from styrene by interpolymerizing it with unsaturated alkyd resins by specialized procedure. Compounds of this type are commercially available and are known to the industry as "styrenated alkyd resins." Although for many purposes the available styrenated alkyd resins are useful, there are many formulations, particularly with phenolic resins in varnishes, where the incompatibility restricts the general usefulness.

The primary purpose of this invention is to provide new transparent coating compositions from styrene and related monomers. A further purpose is to provide a coating composition having unusual resistance to thermo-softening and to the action of organic solvents, water and alkali.

The expression "styrenated alkyd," as used in the protective coating industry and in this specification, means a copolymer of an unsaturated alkyd and a styrene type of monomer, such as styrene, α-methylstyrene, vinylbiphenyl, and isopropenylbiphenyl. The unsaturated alkyd resins are polyester condensation products involving the unsaturated natural drying oil acids, aliphatic polyhydroxy compounds, polycarboxylic acids, and in some cases saturated monocarboxylic acids. Suitable natural drying oil acids are the acids derived from saponification of linseed oil, soy oil, China-wood oil, dehydrated castor oil, oiticia oil, and similar drying and semi-drying oils, and includes oleic acid, linoleic acid, linolenic acid, eleostearic acid, geranic acid, sorbic acid, palmitolic acid, and humeroceric acid. In the preparation of the alkyd resins useful polyhydroxy aliphatic compounds are any of the glycols, such as ethylene glycol, diethylene glycol, triethylene glycol, higher polyethylene glycol and mixtures thereof, the propylene glycols and polypropylene glycols, the higher glycols, such as tetramethylene glycol, hexamethylene glycol and decamethylene glycol, glycerol, sorbitol, mannitol, erythritol and pentaerythritol. Useful carboxylic acids for the alkyd preparation are the phthalic acid, maleic acid, succinic acid, fumaric acid, adipic acid and itaconic acid, and the anhydrides of the cis-dicarboxylic acids. As is conventional in the alkyd preparation art, monocarboxylic acids, such as benzoic acid and salicylic acid, and monohydric alcohol, such as benzoyl and butyl alcohol may be used to terminate the polyester chains.

The styrenated alkyd resins are prepared by first forming the alkyd resin which can be initiated by reacting glycerol with a natural drying oil or with natural drying oil acids, the proportions of reactants being such that the monoglyceride is formed in either case, which is then reacted with polybasic acid and if desired with more glycerol or other polyhydroxy alcohol to produce a final alkyd composition with an acid number between 0 and 20. The initial stage may utilize any of the polyhydroxy alcohols in place of the glycerols, any of the well known polycarboxylic acids as cross-linking agents, and any monocarboxylic acid or alcohol to terminate polyester chains and reduce the average molecular weight of the polyester. The alkyd so formed is a transparent, viscous liquid composition and will have little or no coloration.

The alkyd resins prepared in accordance with the preceding paragraph are then copolymerized with styrene, preferably in the presence of a suitable peroxy catalyst, which is soluble in the mixed monomer, for example benzoyl peroxide, acetyl peroxide, t-butyl hydroperoxide, hydrogen peroxide, or isopropylpercarbonate, or in the polymerization medium. From 0.01 to 5 percent by weight of the peroxide (based on the monomer) may be used.

Several methods are known to be useful in the preparation of the styrenated alkyd resins. If desired the reaction may be conducted in the presence of an inert solvent or diluent, such as xylene, benzene, toluene, dioxane, or petroleum ether at reflux temperature, and adding the styrene type monomer gradually until a reaction mass of pre-determined viscosity is effected, the end-point viscosity being that which will yield a desired viscous liquid copolymer after evaporation of the inert solvent or diluent.

An alternative method of preparing the styrenated alkyd resin, heating a mixture of the alkyd resin and the vinyl or isopropenyl aromatic hydrocarbon and heating them until the monomers are copolymerized to the desired extent as determined by the measured viscosities.

In the United States Patent 2,422,637, issued June 17, 1947, to Charles A. Thomas, there is described and claimed a resinous composition suitable for the preparation of varnishes by dissolution in drying oils. The resinous composition is made by condensing styrene oxide with phenol or a p-alkyl phenol, such as p-cresol, p-ethylphenol, p-t-butylphenol, p-isopropylphenol or other p-alkylphenol having up to six carbon atoms in the alkyl radical.

The styrene oxide-phenol condensation resin is prepared by heating the phenolic constituent and gradually adding a readily desired quantity of arylalkylene oxide, for example from 50 to 200 percent by weight of the phenol, from one to four hours being required for the addition. The temperature required will be from 120° C. to about 225° C., precautions being taken to keep the reaction rate under control, a rapid but not vigorous reaction has been found to produce the best result. After the completion of the reaction further heating at reduced pressures will assist in the removal of unreacted monomers and water produced by the polymerization reaction.

It has been found that coating compositions useful in the preparation of clear, transparent surface films of unusual quality, may be prepared by dissolving in styrenated alkyd resins the resins prepared by condensing the aralkylene oxide phenolic resins. Useful coating compositions may be prepared by utilizing 10 to 90 percent by weight of either component, but the most desirable products are prepared by using from 40 to 60 percent of each component.

The compositions may be prepared by blending drying oil solutions of the styrene oxide-phenol resin and the styrenated alkyd resin, for example from one to ten parts of the styrenated alkyd resin and from one to ten parts of the styrene oxide-phenol resin may be dispersed in from one to ten parts of the drying oil.

The new varnishes may be dried in air but accelerated drying may be induced by heating in a suitable air circulation oven or in the open under infrared lamps. Accelerated room temperature drying may be achieved by the incorporation of conventional driers, for example the lead, cobalt and manganese naphthenates or similar heavy metal salts. If colored films are required conventional dyes and pigments may be added. The coating compositions may also be thinned by the incorporation of conventional diluents, such as turpentine, mineral spirits, coal tar, naphtha, and xylene, the quantity being determined readily by the determination of the viscosity required for the particular method of application contemplated.

Further details of the preparation and use of the new varnishes are set forth with respect to the following specific example.

Example

An oil soluble phenolformaldehyde resin was dissolved in tung oil in the proportions of one hundred pounds of resin for 30 gallons of oil, by mixing and heating at 500° F. for twenty minutes. The viscous solution so produced was then thinned by adding an equal weight of a mixture of 80 percent mineral spirits and 20 percent xylene. A similar phenolic varnish was prepared in an identical manner except that styrene oxidephenol resin was used in place of the phenolformaldehyde. Each of the two phenolic resins was blended in various proportions with a styrenated alkyd resin containing 0.03 percent by weight of cobalt (as cobalt naphthenate) to facilitate drying of the composition. All composition dried tack-free in one hour and set hard within twenty-four hours. The following table indicates the film properties of the various blended varnishes.

| Styrenated Alkyd Resin Percent by Weight | Phenolformaldehyde Resin in Tung Oil Percent by Weight of Resin | Styrene-Oxide-Phenol Resin in Tung Oil Percent by Weight of Resin | Film Properties |
|---|---|---|---|
| 100 | 0 | 0 | Clear. |
| 87 | 13 | 0 | Opaque. |
| 69 | 31 | 0 | Do. |
| 57 | 43 | 0 | Do. |
| 40 | 60 | 0 | Do. |
| 25 | 75 | 0 | Do. |
| 0 | 100 | 0 | Clear. |
| 87 | 0 | 13 | Do. |
| 69 | 0 | 31 | Do. |
| 57 | 0 | 43 | Do. |
| 40 | 0 | 60 | Do. |
| 25 | 0 | 75 | Do. |

The above tabulation demonstrates that styrenated alkyds cannot be blended with conventional phenolic resins since incompatible products are produced, but that combinations of styrene oxide-phenol resins are miscible in all proportions with styrenated alkyd resins and that the dried films remain clear and transparent. Thus, by practicing this invention the improvements in solvent, alkali and water resistance of styrenated alkyd varnishes can be effected without sacrificing the clarity and transparency of the resulting films.

The invention is defined by the following claims.

1. A coating composition comprising a soluble copolymer of from 25 to 75 percent by weight of a compound of the group consisting of styrene, α-methylstyrene, vinylbiphenyl and isopropenylbiphenyl, and from 75 to 25 percent of an unsaturated natural drying oil acid modified alkyd resin having an acid number between 0 and 20, a natural drying oil, and a resin prepared by condensing styrene oxide and a phenol of the formula:

where R is a radical of the group consisting of hydrogen and alkyl radicals having up to six carbon atoms.

2. A coating composition comprising a soluble copolymer of from 25 to 75 percent by weight of styrene and from 75 to 25 percent of an unsaturated natural drying oil acid modified alkyd resin having an acid number between 0 and 20, a natural drying oil, and a condensation product of phenol and from 50 to 200 percent, based on the phenol, of styrene oxide.

3. A coating composition comprising one to ten parts by weight of a soluble copolymer of from 25 to 75 percent by weight of styrene and from 75 to 25 percent of an unsaturated natural drying oil acid modified alkyd resin having an acid number from 0 to 20, from one to ten parts of natural drying oil, and from one to ten parts of a condensation resin of phenol and from 50 to 200 percent, based on the phenol, of styrene oxide.

PAUL E. MARLING.

REFERENCES CITED

The following references are of record in the file of this patent:

UNITED STATES PATENTS

| Number | Name | Date |
|---|---|---|
| 2,392,710 | Wakeford et al. | Jan. 8, 1946 |
| 2,422,637 | Thomas | June 17, 1947 |

OTHER REFERENCES

Reichhold Advertisement in Chem. and Eng. News., vol. 26, No. 7, p. 1966, July 5 1948.